United States Patent
Mori (10) Patent No.: US 8,077,384 B2
(45) Date of Patent: Dec. 13, 2011

(54) OPTICAL AMPLIFIER, AND OPTICAL TRANSMISSION SYSTEM INCLUDING THE OPTICAL AMPLIFIER

(75) Inventor: Shota Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 135 days.

(21) Appl. No.: 12/656,337

(22) Filed: Jan. 26, 2010

(65) Prior Publication Data

US 2010/0134875 A1    Jun. 3, 2010

Related U.S. Application Data

(63) Continuation of application No. PCT/JP2007/064771, filed on Jul. 27, 2007.

(51) Int. Cl.
*H04B 10/17* (2006.01)
*H04B 10/12* (2006.01)
*H01S 3/30* (2006.01)

(52) U.S. Cl. .................................. 359/341.42; 359/334

(58) Field of Classification Search ............. 359/341.42, 359/334

See application file for complete search history.

(56) References Cited

U.S. PATENT DOCUMENTS

| 6,288,836 | B1 * | 9/2001 | Kawasaki et al. | 359/341.42 |
| 6,977,771 | B2 * | 12/2005 | Asao et al. | 359/341.41 |
| 7,343,102 | B2 * | 3/2008 | Tomofuji et al. | 398/160 |
| 7,376,348 | B2 * | 5/2008 | Hasuo et al. | 398/5 |
| 7,471,898 | B2 * | 12/2008 | Shin et al. | 398/30 |
| 7,616,848 | B2 * | 11/2009 | Takeyama et al. | 385/24 |
| 7,619,813 | B2 * | 11/2009 | Maeda et al. | 359/341.42 |
| 2001/0017729 | A1 * | 8/2001 | Sugaya et al. | 359/341.41 |

FOREIGN PATENT DOCUMENTS

| JP | 2000-196169 | 7/2000 |
| JP | 3551418 | 8/2004 |
| JP | 2006-166478 | 6/2006 |

(Continued)

OTHER PUBLICATIONS

International Preliminary Report on Patentability mailed Feb. 18, 2010 in PCT/JP2007/064771.

(Continued)

*Primary Examiner* — Eric Bolda
(74) *Attorney, Agent, or Firm* — Staas & Halsey LLP (57) ABSTRACT

An optical amplifier provided in a repeater station of an optical transmission system is proposed. The optical amplifier amplifies an signal light and performs ALC of output power by means of a variable optical attenuator (VOA). The optical amplifier receives a difference between a target output value and measured output value of an upstream optical amplifier as an expected control volume, and updates a target attenuation value for the VOA in accordance with a current target attenuation value set to the VOA for ALC, a difference between its own target output value and measured output value, and the expected control volume. The target attenuation value is updated at intervals of time exceeding output convergence time by ALC. The difference between the target output value and measured output value of the optical amplifier is adopted as the expected control volume for a downstream optical amplifier. As a result, the waiting time taken for ALC to be stabilized at the time of increment or decrement of the number of wavelengths and signal startup in the optical transmission system where each station performs ALC, can be shortened, and the variation in the level of the signal light power during transition from AGC to ALC is suppressed.

21 Claims, 7 Drawing Sheets

FOREIGN PATENT DOCUMENTS

JP   2006-202900   8/2006
JP   3551418      1/2009

OTHER PUBLICATIONS

Patent Abstracts of Japan, Publication No. 2004-006887, Published Jan. 8, 2004.
European Patent Abstract, Publication No. 0 805 571 B1, Published Nov. 5, 1997.
European Patent Abstract, Publication No. 0 902 565 B1, Published Mar. 17, 1999.
European Patent Abstract, Publication No. 0 902 566 B1, Published Mar. 17, 1999.
Corrected European Patent Abstract, Publication No. 0 902 566 B9, Published Mar. 17, 1999.
European Patent Abstract, Publication No. 0 902 567 A2, Published Mar. 17, 1999.
European Patent Abstract, Publication No. 0 902 567 A3, Published Mar. 17, 1999.
European Patent Abstract, Publication No. 1 578 047, Published Sep. 21, 2005.
Patent Abstracts of Japan, Publication No. 2006-202900, Published Aug. 3, 2006.
Patent Abstracts of Japan, Publication No. 2006-166478, Published Jun. 22, 2006.

* cited by examiner

| ADDRESS | D7 | D6 | D5 | D4 | D3 | D2 | D1 | D0 |
|---|---|---|---|---|---|---|---|---|
| 00 | | | | | | | | AGC/ALC |
| 01 | NUMBER OF WAVELENGTHS ||||||||
| 02 | | | | | | | | UPDATE TRIGGER |
| 03 | EXPECTED CONTROL VOLUME[dB] ||||||||
| 04 | TARGET OUTPUT VALUE OF TRANSMISSION LINE [dBm] ||||||||
| 05 | MEASURED OUTPUT VALUE OF TRANSMISSION LINE [dBm] ||||||||
| 06 | | | | | | OSC AIS | WDM AIS | APSD |
| 07 | | | | | | | | |

FIG. 7

OPTICAL AMPLIFIER, AND OPTICAL TRANSMISSION SYSTEM INCLUDING THE OPTICAL AMPLIFIER

CROSS-REFERENCE TO RELATED APPLICATION

This application is based upon and claims the benefit of priority of the prior International Application No. PCT/JP2007/064771, filed on Jul. 27, 2007, the entire contents of which are incorporated herein by reference.

FIELD

The present invention relates to an optical amplification technique in Wavelength Division Multiplex (WDM) optical transmission, and in particular, relates to an optical amplifier adopting an Automatic Level Control (ALC) system.

BACKGROUND

In optical transmission systems, in order to absorb loss variation generated in an optical transmission line, ALC that controls output power of an optical amplifier provided in a transmitting station, a repeater station, and a receiving station, to be constant, is adopted. ALC is a control system that monitors the output power of the optical amplifier and performs feed-back control so that a measured value thereof becomes a predetermined target value. By using ALC, even in a case where a loss in the optical transmission line varies due to variations such as a bending loss of an optical fiber or a connector loss, in the optical transmission system after operation has been started once, the optical output can be returned to a constant value, and quality of a signal can be maintained.

Current mainstream optical transmission systems use a WDM system, and the optical amplifier widely used for the system adopts an Erbium Doped Fiber Amplifier (EDFA). The EDFA has a characteristic in that when amplification gain is changed, a wavelength characteristic of the gain changes. Thus, in a setup that performs ALC by adjusting the gain of the EDFA, a uniform gain characteristic cannot be maintained over a whole wavelength range of a WDM signal light. Accordingly, in recent optical amplifiers, Japanese Patent No. 3551418 discloses that a technique has been adopted where the gain of the EDFA is maintained at a constant value by Automatic Gain Control (AGC) so that the wavelength characteristic becomes uniform, and ALC is performed by adjusting the loss by a Variable Optical Attenuator (VOA).

At the time of implementation of ALC, the output power for each wavelength is not controlled to be constant in the WDM signal light in which optical signals of different wavelengths are multiplexed, unless all the wavelengths included in the WDM signal light have a uniform power. Thus, ALC cannot be performed while the number of wavelengths is increased or decreased in the WDM optical transmission system, that is, an addition of the optical signal of an unused wavelength or a deletion of the optical signal of a wavelength being used, and level adjustment for each wavelength needs to be performed, and the implementation of ALC needs to wait until the power of all the wavelengths is adjusted to be uniform. Therefore, Japanese Laid-open Patent Publication No. 2000-196169 discloses that a control system has been proposed where, in a normal state in which the number of wavelengths is determined, ALC by the VOA is performed, while at the time of increasing or decreasing the number of wavelengths the VOA is stopped to perform only AGC of the EDFA, and after the power of all the wavelengths is uniformly adjusted after increment or decrement of the number of wavelengths, ALC by the VOA is resumed.

In optical transmission systems that include an optical amplifier adopting such an ALC as a repeater station, and perform long-distance transmission, when the number of wavelengths is increased or decreased, it is required that there is as little as possible change in the characteristics of the optical power, an optical SN ratio and so on. This point is considered from a point of view of attenuation control of the VOA. At first, at the time of starting increment or decrement of the number of wavelengths, when the optical amplifier in an ALC state is changed over to an AGC state, a target attenuation value of the VOA needs only to be fixed to a value immediately before changeover in the optical amplifier. Accordingly there is no variation in the power of respective wavelengths, causing no major problem.

On the other hand, when ALC is resumed from the AGC state upon completion of increment or decrement of the number of wavelengths, attention is necessary. That is, the target attenuation value of the VOA corresponding to the number of wavelengths after the increment or decrement of the number of wavelengths may be different from the target attenuation value before the increment or decrement of the number of wavelengths. In this case, the attenuation value may be changed, thereby causing a variation in the wavelength power.

In the optical amplifier, the gain of the EDFA is controlled to be constant by AGC, and there is no variation factor other than the attenuation value of the VOA. Thus, if the input power is constant, feed-back control needs only to be performed with respect to the output power. However, if there is a change in the input power, the output power is also changed due to an influence thereof, thereby making the control unstable. Accordingly, at the time of controlling the attenuation value of the VOA, it is necessary to guarantee that the input power of the optical amplifier is stable. In order to guarantee stability of the input power, in a case where the attenuation value of the VOA is changed in optical amplifiers arranged in many repeater stations, that is, in a case where ALC is to be performed, sequence control needs to be performed where, ALC is performed sequentially from an upstream side of optical transmission and proceeds to ALC in the next station after waiting for the output power of an upstream station to converge on a target output value and become stable.

This sequence control is not limited to at the time of increment or decrement of the number of wavelengths, and is also required at the time of startup after a disconnect of signal (recovery). That is, also at the time of startup from the disconnect of signal, the optical output needs to be started up by ALC sequentially from the upstream station. In a downstream station, when an optical signal is output from the upstream station, a disconnect of input in the own station is recovered. However, at this time, unless ALC by the VOA is stable in the optical amplifier in the upstream station, a variation in the output power occurs. Because time is required until the output power is stabilized to the target output value by ALC, if ALC is resumed also in the downstream station immediately after start of optical output in the upstream station, startup is performed while the output power of the upstream station, that is the input power of the downstream station, is still unstable, thereby causing a variation in the wavelength power. Therefore, the sequence control is required similarly to at the time of increment or decrement of the number of wavelengths, where startup of the downstream station waits until ALC in the upstream station becomes stable.

When control speed is taken into consideration for ALC by the VOA in the optical amplifier, it is natural that as the control speed of the VOA increases, time required for stabilizing the power of the entire optical transmission system decreases. However, there is a limitation to speeding up of real-time control by ALC, due to reasons described below.

As described above, AGC is performed with respect to the EDFA in order to make the wavelength characteristic of the gain constant. In the EDFA, because the response time determined by the physical characteristics thereof is comparatively slow of the order of milliseconds (ms), the control speed of AGC is limited by the response time. AGC of the EDFA and ALC by the VOA are operated as a double loop, and when the control speeds of these devices approximate to each other, oscillation may occur. Therefore, the control speed of ALC needs to be 100 times as high as that of AGC, that is, it may not be faster than an order of 0.1 second.

Moreover, a variation in the level at the time of occurring disconnect of signal also limits the speed up of ALC. When a disconnect of signal occurs due to a fault of a light source corresponding to a wavelength channel or a cut of an optical fiber connected to the wavelength multiplexing section or the like, because this is an emergency, increment or decrement of the number of wavelengths occurs during ALC execution in the optical amplifier. For example, in an optical transmission system operated with 10 wavelengths, when 9 wavelengths disappear due to the disconnect of signal, an abrupt variation occurs where the power of the WDM signal light decreases to $\frac{1}{10}$. In this case, detection of the disconnect of signal is performed by an electric circuit in a station where the disconnect of signal has occurred, and this is used as a trigger to give a notice of a transition request to AGC to the optical amplifier on a downstream side of the station where the disconnect of signal has occurred. However, because the signal light being transmitted has been transmitted at the velocity of light, the disconnect of signal reaches the downstream station faster than the notice of the transition request to AGC, and during the time lag, execution of ALC is maintained in the optical amplifier in the downstream station. That is, because the optical amplifier in the downstream station does not know that the number of wavelengths has varied due to the disconnect of signal, during the time lag, the optical amplifier determines that the input power has decreased, and performs release control of the VOA to increase the output power up to 10 times. The optical amplifier in the downstream station stops the release control of the VOA later at a point in time when the notice of the transition request to AGC is received. However, when the control speed of ALC is high, release control time during the time lag becomes long because of a quick reaction to the signal light, and hence, a redundant variation in the level occurs in the power of the wavelength, which remains without being cut.

Also in order to suppress an amount of variation in the level at the time of abnormality, ALC may not be performed at high speed. For example, if it is assumed that the time required from detection of the disconnect of signal until a transition request to AGC is transmitted by a transmission section of an Optical Supervisory Channel (OSC) is 30 ms, the time required for photoelectrically converting a notification signal delivered to the downstream station by the OSC to extract the transition request from a payload thereof to AGC, and re-transmitting the notification signal to the next station is 1 ms per one span, and the number of relay spans is 10, then a time of 40 ms is required until the transition request to AGC reaches the receiving station. In order to suppress the variation in the level during this period to 0.05 dB or less, the control speed cs [dB/s] of ALC needs to be: $cs[dB/s] \times 40$ ms $\leq 0.05$ dB, that is, $cs \leq 1.25$ [dB/s].

According to the above-described conditions, the speed of real-time control of the VOA by ALC is set to about 1 dB/s. Actually, it is devised such that when a difference of an actual output value from the target output value is large, the control speed is increased, and when the output value approximates to the target output value, the control speed is decreased. However, an output convergence time required until the attenuation control of the VOA is stabilized, is from 10 to 20 seconds due to the limitation in the control speed of ALC.

Moreover, in the WDM optical transmission system, an optical amplifier having a two-stage configuration in which a Dispersion Compensating Fiber (DCF) is arranged between the EDFAs is frequently used in order to compensate wavelength dispersion in the optical transmission line. In this case, when the VOA is built in to each of the stages, ALC by two VOAs is performed for each station, thereby requiring double time. Moreover, in order to improve the optical SN ratio or enlarge an interval between the repeater stations, a technique is adopted where a Raman optical amplifier using an induced Raman scattering effect in the optical transmission line is also used together for the optical amplifier using the EDFA. In this case, because of a relation where, when Raman pump light is increased, the input power to the EDFA increases, ALC is performed also in the Raman optical amplifier. Therefore, in the case of the optical transmission system including the Raman optical amplifier, the control time associated with ALC for the Raman optical amplifier is added, thereby requiring additional time.

Thus, in the optical transmission system in which the DCF is used for the optical amplifier and the Raman optical amplifier is also used together, when the sequence control for performing ALC sequentially from the upstream side is performed, an output convergence time of from 30 seconds to several minutes is required for one repeater station, and a waiting time for stabilization of this time multiplied by the number of relay spans is required. For example, in a case where the output convergence time by ALC is up to 2 minutes for each station, and there are 10 repeater stations, a waiting time for stabilization of 20 minutes may be required in the entire system.

In an increment or decrement operation of the number of wavelengths or a replacement operation of a faulty wavelength channel, quality of the signal light is ensured by completing ALC after issuing an operation complete instruction. Therefore, a line quality verification test is performed thereafter. At this time, if several tens minutes are required for the waiting time taken for ALC to be stabilized, operation efficiency is poor. Moreover, in a WDM optical transmission system capable of large-capacity transmission, stability of the line and quick recovery from a fault such as power failure are important, and the time of disconnect of signal needs to be as short as possible. That is, in an optical transmission system including many stations, an improvement is desired for the total waiting time for stabilization required for performing ALC sequentially for the number of stations, which has a limitation in the control speed as described above.

In addition to the above-mentioned waiting time taken for ALC to be stabilized, there is also an improvement required for the variation in the level of the signal light. This will be explained with reference to FIG. 4A. In the example illustrated in the figure, three repeater stations provided between a transmitting station and a receiving station are indicated, and it is assumed that each repeater station includes the EDFA and the VOA to perform ALC such as described above. Moreover, a target output value of the wavelength output power of all the stations by ALC is set to 0 dBm/ch.

When each station is in the AGC state at the time of startup or the like, it is assumed that a measured output value of each station is 1 dBm/ch for a first repeater station, −1 dBm/ch for a second repeater station, and 0 dBm/ch for a third repeater station, and ALC is performed in this situation. As described above, because the ALC is started sequentially from the upstream station, first, ALC for the first repeater station is performed. In the first repeater station, because the measured output value during AGC is higher than the target output value by 1 dB, ALC is performed by increasing the target attenuation value of the VOA by 1 dB. In each downstream repeater station at this time, the target attenuation value of the VOA is fixed. Subsequently, after the output convergence time of the first repeater station, ALC is performed for the second repeater station. However, at this time, because the measured output value of the second repeater station becomes −2 dBm/ch due to an influence of ALC of the first repeater station, ALC is performed for the second repeater station by decreasing the target attenuation value of the VOA by 2 dB. Subsequently, after the output convergence time of the second repeater station, ALC is performed for the third repeater station. However at this time, because the measured output value of the third repeater station becomes 1 dBm/ch due to the influence of ALC of the second repeater station, then in the third repeater station the target attenuation value of the VOA is increased by 1 dB.

During sequential execution of ALC with respect to the repeater stations, the power of each wavelength reaching the receiving station varies such that it increases by 2 dB after decreasing by 1 dB, and then decreases by 1 dB. In a receiving station having no margin in the characteristic, there is possibility of causing an error due to the variation in the level. Therefore, it is desired to suppress the variation in the level as much as possible.

SUMMARY

An optical amplifier according to a first aspect of the present invention is provided in a repeater station of an optical transmission system to amplify signal light and perform ALC of output power by means of a Variable Optical Attenuator (VOA). The optical amplifier receives a difference between a target output value and measured output value of an upstream optical amplifier as an expected control volume, and updates a target attenuation value for the VOA in accordance with; a current target attenuation value set to the VOA for ALC, a difference between its own target output value and measured output value, and the expected control volume, while updating the target attenuation value at intervals of time exceeding output convergence time by ALC. The difference between own target output value and measured output value of the optical amplifier is adopted as an expected control volume for a downstream optical amplifier.

An optical amplifier according to a second aspect of the present invention is provided in a transmitting station of an optical transmission system to amplify a signal light and perform ALC of output power by means of a VOA. The optical amplifier updates a target attenuation value for the VOA in accordance with a current target attenuation value set to the VOA for ALC and a difference between its own target output value and measured output value, while updating the target attenuation value at intervals of time exceeding output convergence time by ALC, and transmits the difference between its own target output value and measured output value to a downstream optical amplifier as an expected control volume.

An optical amplifier according to a third aspect of the present invention is provided in a receiving station of an optical transmission system to amplify a signal light and perform ALC of output power by means of a VOA. The optical amplifier receives a difference between a target output value and measured output value of an upstream optical amplifier as an expected control volume, and updates a target attenuation value for the VOA in accordance with; a current target attenuation value set to the VOA for ALC, a difference between its own target output value and measured output value, and the expected control volume, while updating the target attenuation value at intervals of time exceeding output convergence time by ALC.

According to another aspect of the present invention, an optical transmission system including the above-described optical amplifier in each station is proposed. That is, each of the transmitting station, the repeater station, and the receiving station of the optical transmission system includes the optical amplifier that amplifies the signal light and performs ALC of the output power by the VOA. The optical amplifier in the transmitting station of the optical transmission system updates the target attenuation value for the VOA in accordance with the current target attenuation value set to the VOA for ALC and the difference between its own target output value and measured output value, while updating the target attenuation value at intervals of time exceeding the output convergence time by ALC, and transmits the difference between its own target output value and measured output value to the downstream optical amplifier as the expected control volume. Moreover, the optical amplifier in the repeater station of the optical transmission system receives the difference between the target output value and the measured output value of the upstream optical amplifier as the expected control volume, and updates the target attenuation value for the VOA in accordance with; the current target attenuation value set to the VOA for ALC, the difference between its own target output value and measured output value, and the expected control volume, while updating the target attenuation value at intervals of time exceeding the output convergence time by ALC, in which the difference between its own target output value and measured output value is adopted as the expected control volume for the downstream optical amplifier. Furthermore, the optical amplifier in the receiving station of the optical transmission system receives the difference between the target output value and the measured output value of the upstream optical amplifier as the expected control volume, and updates the target attenuation value for the VOA in accordance with the current target attenuation value set to the VOA for ALC, the difference between its own target output value and measured output value, and the expected control volume, while updating the target attenuation value at intervals of time exceeding the output convergence time by ALC.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

DESCRIPTION OF EMBODIMENTS

According to the embodiments as set forth below, in an optical transmission system where each station performs ALC, the waiting time taken for ALC to be stabilized at the time of increment or decrement of the number of wavelengths and signal startup is shortened. Moreover, according to the embodiments as set forth below, the variation in the level of the signal light power during transition from AGC to ALC is suppressed.

Figure 1:
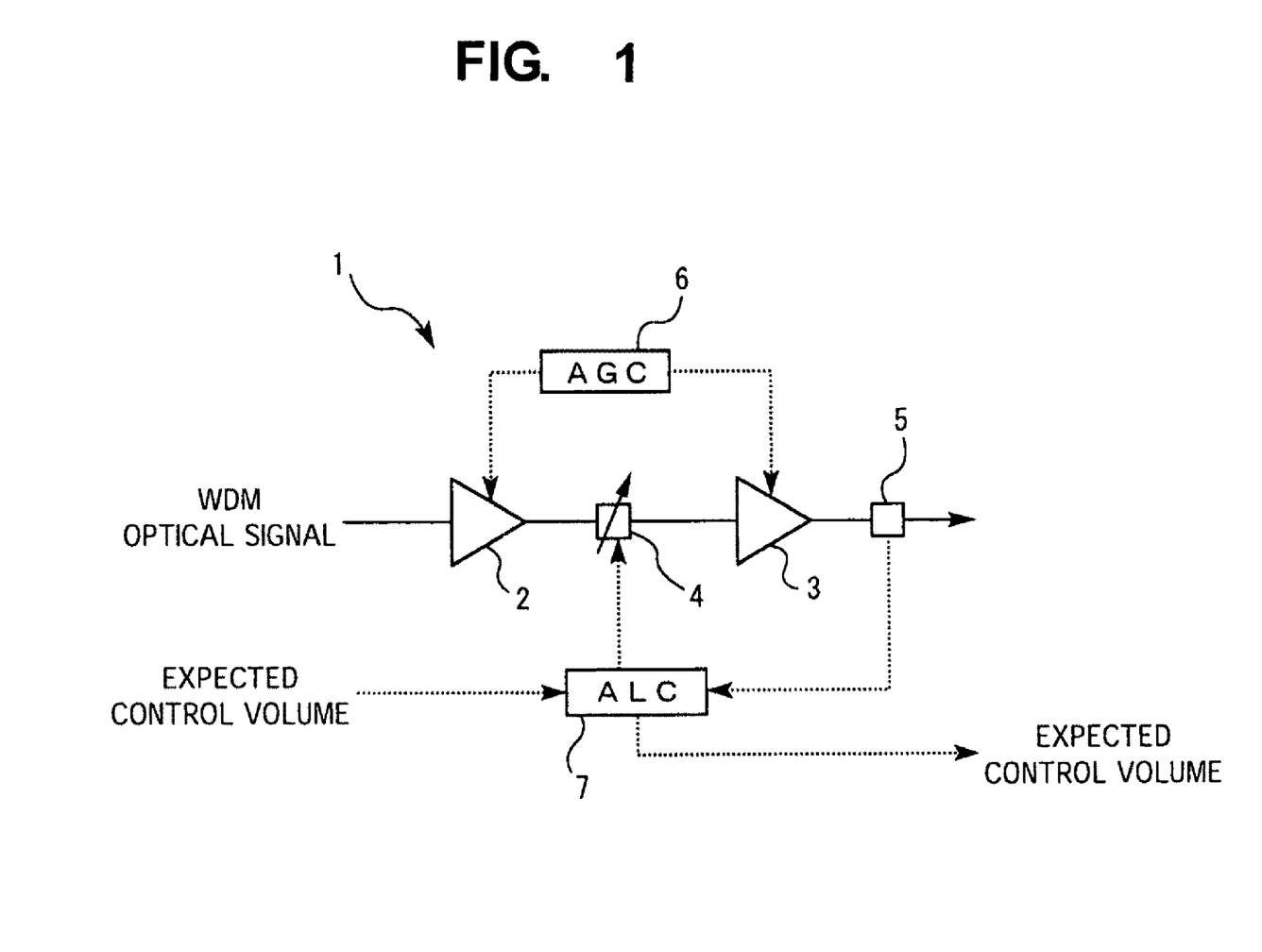
FIG. 1 is a diagram illustrating an embodiment of an optical amplifier according to the present invention.

FIG. 1 is a diagram illustrating an example of an optical amplifier used for a WDM optical transmission system. An optical amplifier 1 in this example uses an EDFA, and has a configuration where a VOA 4 is disposed between cascaded two-stage EDFAs 2 and 3. The optical amplifier 1 monitors an output power of the EDFA 3 using an output power monitor 5 to obtain a measured output value.

The EDFA has a characteristic in that when amplification gain is changed, a wavelength characteristic of the gain changes. Therefore a gain controller 6 performs AGC for gains of the EDFAs 2 and 3 to maintain a certain value where the wavelength characteristic of a WDM signal light is uniform. On the other hand, ALC is performed with respect to the VOA 4 to maintain a constant output power by adjusting attenuation by an output controller 7. ALC performed by the output controller 7 is explained below.

First, a calculation method of a target output value in the optical amplifier 1 is illustrated. The target output value is an output power of the entire WDM signal light, and may be calculated according to "target output value (dBm)=output power per one wavelength (dBm/ch)+10 LOG [number of wavelengths] (dB)+ASE yield (dB)". In this equation, the number of wavelengths is the number of wavelengths multiplexed in the signal light, and, for example, is managed in a transmitting station that multiplexes the wavelengths. The output power per one wavelength is a fixed parameter set for each type of fiber because of a factor described below. That is, a higher level is advantageous as the optical SN ratio, but if it is too high, distortion occurs in the waveform of the signal light due to non-linear response of the optical fiber transmission line, and hence, required characteristics may not be obtained. The ASE yield is a value that is dB converted using the accumulated power of noise light generated in the optical amplifier such as the EDFA, as a ratio with respect to the signal light, and is converted based on an individually measured noise quantity because the ASE yield is affected by the characteristic of the optical amplifier.

As one example, if it is assumed that the output power per one wavelength is 0 dBm/ch, the number of wavelengths is 20 wavelengths, and the ASE yield is 0.5 dB, the target output value=0+10 LOG [20]+0.5=13.5 dBm.

The output controller 7 stores the target output value calculated in this manner, and calculates a difference between the target output value and the measured output value obtained from the output power monitor 5. Then the output controller 7 corrects the current target attenuation value set to the VOA 4 based on this difference to determine the target attenuation value. However the calculation equations are different in the transmitting station, the repeater station, and the receiving station to one another.

In the transmitting station, there is no upstream station, and thus, the transmitting station needs only to consider ALC of the own station. That is, the determination equation of the target attenuation value is: "target attenuation value (dB)=current target attenuation value−[target output value−measured output value]". On the other hand, because the repeater station is affected by the upstream station, the repeater station receives [target output value−measured output value] in the upstream station as an expected control volume, and determines the target attenuation value, also taking the expected control volume into consideration. That is, the determination equation thereof is: "target attenuation value (dB)=current target attenuation value+expected control volume−[target output value−measured output value]". Moreover, because the receiving station is also similarly affected by the upstream station, the determination equation thereof is: "target attenuation value (dB)=current target attenuation value+expected control volume−[target output value−output measurement value]". However, in the case of the receiving station, it is not necessary to transmit the expected control volume of the own station to a downstream station.

That is, in the upstream station, because it is next expected to change the output power by the expected control volume, the target attenuation value of the downstream station is determined, also taking the change in the output power of the upstream station into consideration, and as a result, the output power of the own station is maintained constant. At this time, the expected control volume to be transmitted from the repeater station to the downstream station is only "target output value−measured output value]" of the own station. If it is assumed here for explanation that [target output value−measured output value] of the transmitting station is A1 and [target output value−measured output value] of the next repeater station is A2, when the output power is increased by A1 in the transmitting station, the output power is to be increased by [A2−A1] in the repeater station that receives the rise value A1 as the expected control volume. As a result, in the repeater station, it is expected to increase the output by [A1+A2−A1=A2]. Accordingly, A2 is transmitted to the downstream station as the expected control volume.

However, even if the target attenuation value of the own station is determined, also taking the expected control volume of the upstream station into consideration, because the input power of the own station is still unstable until the output power of the upstream station is stabilized, the problem of waiting for the output convergence time by ALC in the upstream station is not solved. Therefore, the output controller 7 performs update of the target attenuation value with respect to the VOA 4 at intervals of time exceeding the output convergence time. As a result, even if the input power is unstable due to the influence of ALC in the upstream station, it is not reflected in the target attenuation value, and control of the VOA 4 can be performed stably.

For example, when the control speed of ALC is an order of 1 dB/s, it is considered that the output convergence time is expected to be 10 seconds, and adjustment by 10 dB is performed during that time. Therefore, it is considered that the output power would be sufficiently stabilized during that time. Accordingly, the target attenuation value is updated at intervals of time exceeding the expected output convergence time to thereby update the target attenuation value at the right moment when the attenuation of the VOA 4 reaches the target value in each station, and ALC is performed, ignoring the measured output value between the updates. Therefore, convergence to the target output value is performed without being affected by the variation of the input power. As the output convergence time, the time when the output actually converges on the target value (the output power actually becomes stable) need not be strictly adopted, and the expected output convergence time (time considered to converge) may be adopted.

Figure 2:
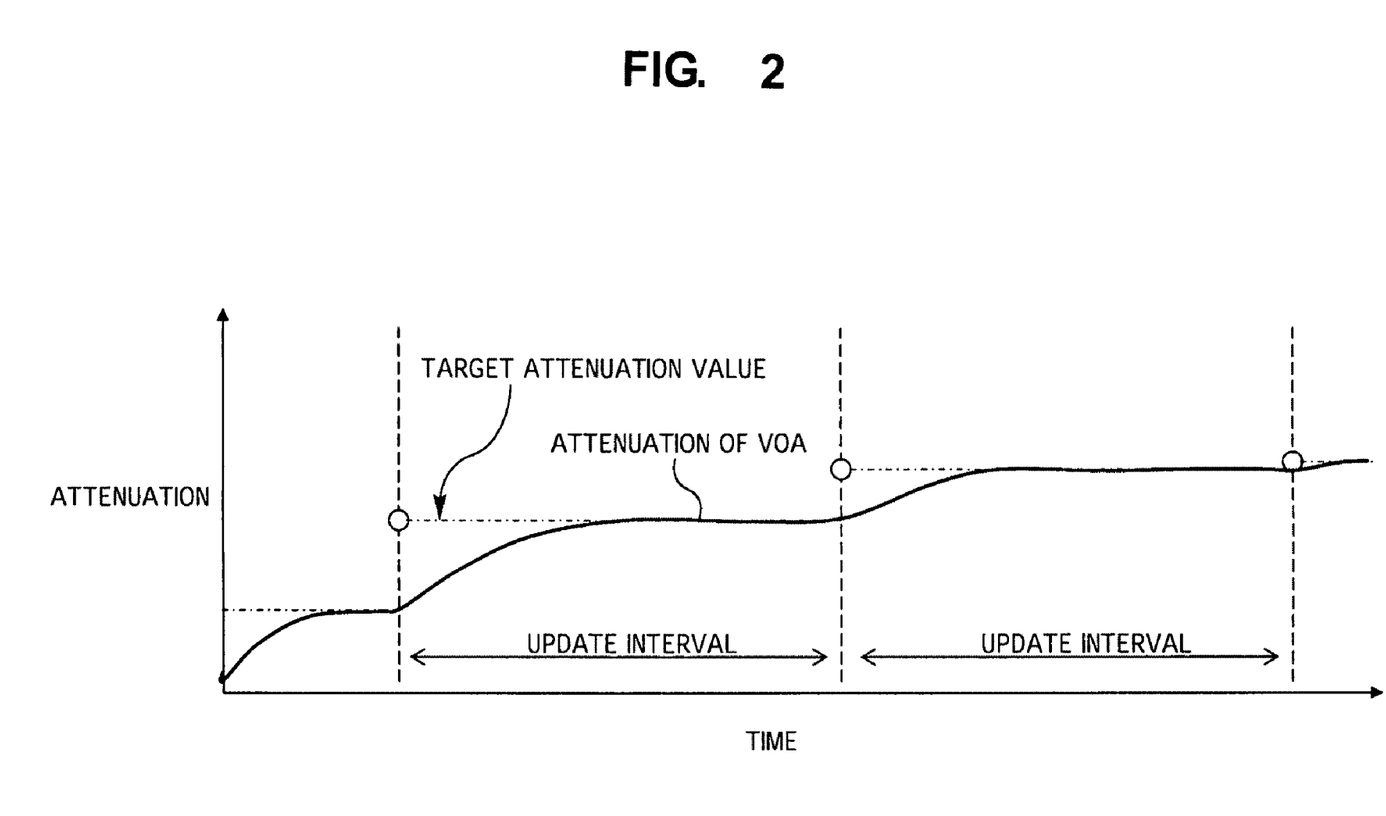
FIG. 2 is a diagram for explaining an update interval of a target attenuation value.

FIG. 2 illustrates the update interval. By setting the update time of the target attenuation value to be 10 seconds as described above, the target attenuation value is updated for each 10 seconds according to the determination equation described above. Because ALC in which the attenuation of the VOA 4 is matched with the target value, ignoring the measured output value by the output power monitor 5, is performed by the output controller 7 during the update interval of 10 seconds (attenuation of VOA indicated by the solid line in FIG. 2), the variation of the input power is not affected.

The update interval of the target attenuation value can be set by the methods described below.
1. A method in which the update interval is each counted in the respective stations from, for example, a common clock.
2. A method in which it is assumed that the transmitting station is a master, and the repeater station and the receiving station are slaves, and a command is issued from the transmitting station as the master to the slave stations for each update interval to update.
3. A method in which the master is not assumed, and the respective stations communicate with the adjacent station to inform the update.
4. A method in which a change of a value received from the upstream station is detected and stored as A1, and A1 and A2 are updated at the update interval in the respective stations.

Figure 3:
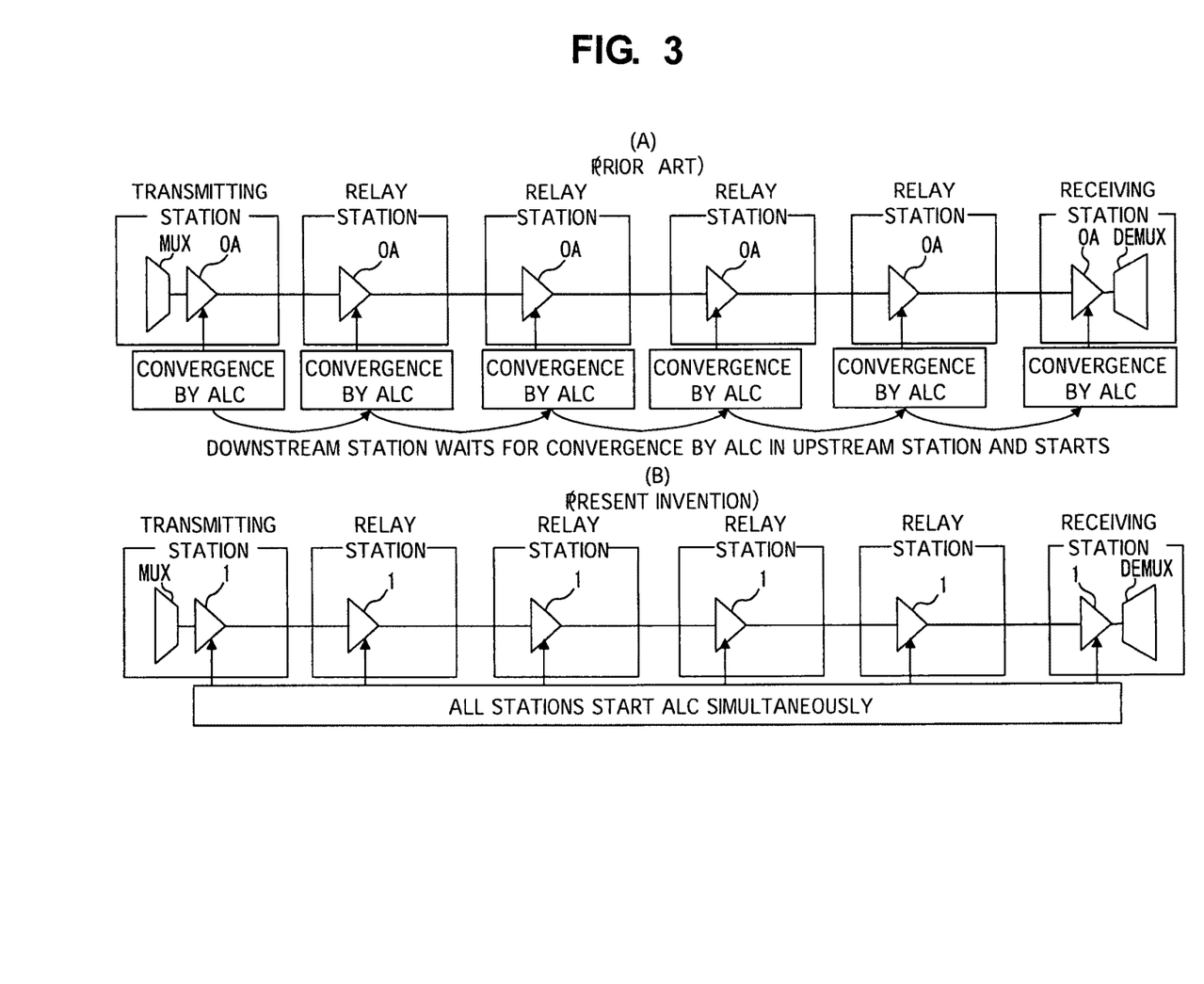
FIG. 3 is a diagram for explaining waiting time for stabilization of an optical transmission system according to the present invention (FIG. 3B) as compared with the related art (FIG. 3A)

A reduction effect of the waiting time for stabilization in the WDM optical transmission system in which the optical amplifier 1 illustrated in FIG. 1 is provided in the four repeater stations, the transmitting station, and the receiving station is illustrated in FIG. 3 in comparison with the related art. FIG. 3A explains the case of the related art, and FIG. 3B explains the case of the present invention. In FIG. 3A, the transmitting station includes a multiplexer MUX that multiplexes optical signals of respective wavelengths and a conventional optical amplifier OA, the receiving station includes the conventional optical amplifier OA and a demultiplexer DEMUX that demultiplexes the WDM signal light, and the respective repeater stations include the conventional optical amplifier OA. On the other hand, in FIG. 3B, the transmitting station includes the multiplexer MUX and the optical amplifier 1, and the receiving station includes the optical amplifier 1 and the demultiplexer DEMUX. Furthermore, the respective repeater stations amplify and relay the WDM signal light by the optical amplifier 1.

In the case of the related art illustrated in FIG. 3A, the target attenuation value is controlled on a real time basis in the optical amplifier OA in each station. Therefore, at the time of startup after increment or decrement of the number of wavelengths or disconnect of signal, a sequence control is required that starts ALC in the downstream station after waiting for convergence by ALC in the upstream station, that is, stabilization of the output power. As a result, because the waiting time for stabilization of from several seconds to several minutes required in each station is accumulated, a waiting time for stabilization of up to several minutes is required.

On the other hand, in the case of the present invention illustrated in FIG. 3B, because the update interval of the target attenuation value associated with the VOA 4 of the optical amplifier 1 is set to be an interval of time exceeding the output convergence time by ALC in the respective stations, ALC can be started in all the stations simultaneously. That is, from several seconds to several minutes are required in each station for the output convergence time by ALC. However, because the update of the target attenuation value is suspended during the output convergence time and the variation of the output power is not reflected in the target attenuation value, influence on ALC is suppressed even if there is a variation in the input power of the own station (output power of the upstream station), and the output power can converge on a constant target output value. Accordingly, all the stations can start ALC simultaneously, so that the waiting time for stabilization can be just from several seconds to several minutes corresponding to the output convergence time.

Figure 4:
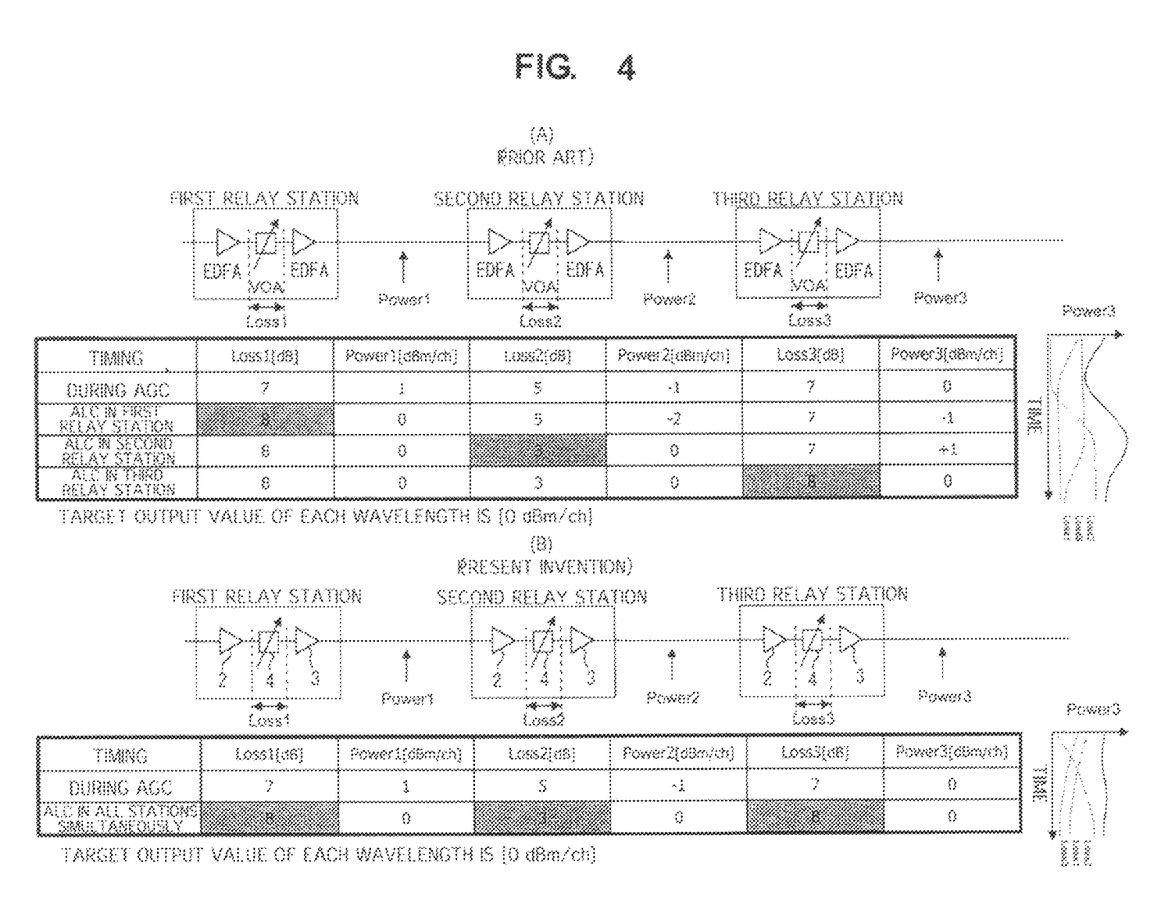
FIG. 4 is a diagram for explaining a level variation suppression in the optical transmission system according to the present invention (FIG. 4B) as compared with the prior art (FIG. 4A)

Next, FIG. 4 illustrates a reduction effect of the variation in the level of the signal light in comparison with the related art. FIG. 4A explains the case of the related art, and FIG. 4B explains the case of the present invention. In the example in FIG. 4, the three repeater stations provided between the transmitting station and the receiving station are illustrated, and the respective repeater stations include the EDFA and the VOA, and perform ALC. Moreover the target output value of the wavelength power of all stations by ALC is set to 0 dBm/ch.

In the case of the related art illustrated in FIG. 4A, ALC is started sequentially from the upstream station. In the first repeater station, because the measured output value is 1 dB higher than the target output value, ALC is performed by increasing the target attenuation value of the VOA by 1 dB. Then, after the output convergence time of the first repeater station, ALC for the second repeater station is performed. At this time, because the measured output value of the second repeater station becomes −2 dBm/ch due to the influence of ALC for the first repeater station, ALC is performed by decreasing the target attenuation value of the VOA by 2 dB in the second repeater station. Subsequently, after the output convergence time of the second repeater station, ALC for the third repeater station is performed. At this time, because the measured output value of the third repeater station becomes 1 dBm/ch due to the influence of ALC for the second repeater station, the target attenuation value of the VOA is increased by 1 dB in the third repeater station. Due to this sequential ALC by the repeater stations, the power of each wavelength reaching the receiving station varies such that it increases by 2 dB after decreasing by 1 dB, and then decreases by 1 dB (refer to the waveform of power 3).

On the other hand, in the case of the present invention illustrated in FIG. 4B, because the expected control volume is received from the upstream station to calculate the target attenuation value and ALC is started simultaneously in all the stations, ALC is performed simultaneously such that the VOA 4 of the first repeater station increases the attenuation by 1 dB, the VOA 4 of the second repeater station decreases the attenuation by 2 dB, and the VOA 4 of the third repeater station increases the attenuation by 1 dB. As a result, the VOA 4 in each station operates to balance out the variation to one another, and because the control speed of the VOA 4 is the same in all the stations, the variation of the signal light power is suppressed. That is, a configuration is provided in which the respective stations introduce a mechanism to notify the downstream station of the own expected control volume (expected variation of the output power of the upstream station that can occur up until the next update), to thereby set in the own station, the target attenuation value in which the expected variation of the input power is added or subtracted, so that a large variation of the output power does not occur (refer to the waveform of power 3).

In the above WDM optical transmission system, at the time of startup of the system after the disconnect of signal has occurred due to power failure or the like, an initial value needs to be provided as the target attenuation value. In the case of increment or decrement of the number of wavelengths, an operation can be performed while shifting control from ALC→AGC→ALC in a system operating state. Therefore, the target attenuation value can be fixed at a value at the time of shifting from ALC to AGC, and at the time of shifting from AGC to ALC after increment or decrement of the number of wavelengths, control can be started from the fixed value. However, when the disconnect of signal occurs, a value that can be used at the time of startup is not always stored. Therefore, a value provided as the initial value needs to be predetermined for such a situation.

Because transmission line loss is unknown at the time of startup after the disconnect of signal, a value for converging the VOA may not be known unless the system is started up. Therefore, attenuation of the VOA 4 such that when the input power of the own station becomes a predetermined value within an input dynamic range of an EDFA 2, the output power of the optical amplifier 1 becomes the target output value, is set as the initial value. However, if the output power is too high at the time of startup with the initial value, an excess of power may occur in the photoelectric converter portion that receives the output power. Accordingly, it is acceptable to set the initial value so as to provide an output power as low as possible. Under such circumstances, it is preferred to set a target attenuation value to be applied when the signal light is input with an upper limit power of the input dynamic range of the optical amplifier 1 as the initial value of the target attenuation value. For example, when it is assumed that the input dynamic range is from −20 to −10 dBm/ch, the target output value is 0 dBm/ch, and the gain of the EDFA is fixed to 22 dB, the target attenuation value is set to 12 dB so that the output power becomes 0 dBm/ch with the upper limit of the input dynamic range of −10 dBm/ch.

It may also be considered to set the initial value of a VOA drive circuit in addition to setting of the initial value of the target attenuation value. That is, the attenuation of the VOA 4 is feed-back controlled based on the measured output value by the output power monitor 5. However, because the control is feed-back control, it only functions after an optical output is generated by operating the EDFAs 2 and 3. Therefore, the target value can be reached at an early stage by setting a value corresponding to the initial value of the target attenuation value in the drive circuit. Because the VOA drive circuit has a configuration where control is performed by current or voltage, a relation between the current or voltage and the attenuation of the VOA is measured beforehand, and a current value or voltage value corresponding to the initial value of the target attenuation value can be determined as the initial value.

Next, in the optical transmission system, a case will be explained where, after the signal light is once communicated, an output of the optical amplifier 1 is suspended due to a power cut or fiber cut in any station, and this is recovered to restart the system. Also in this case, startup can be performed using the initial value, as in the case of the disconnect of signal. However, because it is an emergency suspension after the signal light is once communicated, a value at the time of communication can be stored as the initial value, to thereby start up the system promptly.

That is, when the output of the optical amplifier 1 in the own station is suspended due to a power cut or fiber cut in the upstream station, a value immediately before suspension of the output is held as the target attenuation value of the VOA 4. When the output of the optical amplifier 1 is suspended, feed-back control may not be performed. Therefore, at this time feed back is stopped, and a control current or voltage of the VOA drive circuit can be held at the value immediately before suspension. When a failure is recovered to restart the system, the held value is applied to operate the pump light of the EDFAs 2 and 3, to thereby restart AGC, and recovery can be performed with an original output power. Thereafter, ALC may be restarted in each station to resume a normal operating state. In this case, the startup speed is determined by AGC after activating the EDFA, and can be converged on the target value in an order of 1 ms.

A method for holding the value immediately before the suspension of output, is based on the assumption that a loss condition on the input side does not change before and after the suspension of output. Therefore, when the loss condition may change due to replacement of the fiber in the transmission line on the input side or the like, the above-described method of using the predetermined initial value determined beforehand is more suitable. To determine a change in the loss condition for selecting the initial value, this can be determined based on whether or not there is a loss of OSC (optical supervisory channel) signal received from the upstream station. If there is no loss of OSC signal, a transmission line fiber on the input side has not changed, and startup can be performed according to the aforementioned method of holding the value immediately before, assuming that there is no change in the loss condition. On the other hand, when a loss of OSC signal is detected, startup can be performed with the predetermined initial value determined beforehand as described above, assuming that there is a replacement of the fiber in the transmission line on the input side and the loss condition has changed. When the fiber is replaced due to a failure in the optical amplifier 1 of the own station, there is high possibility that the loss condition has changed associated with the replacement, and hence, it is preferred to start up the system with the predetermined initial value determined beforehand.

Figure 5:
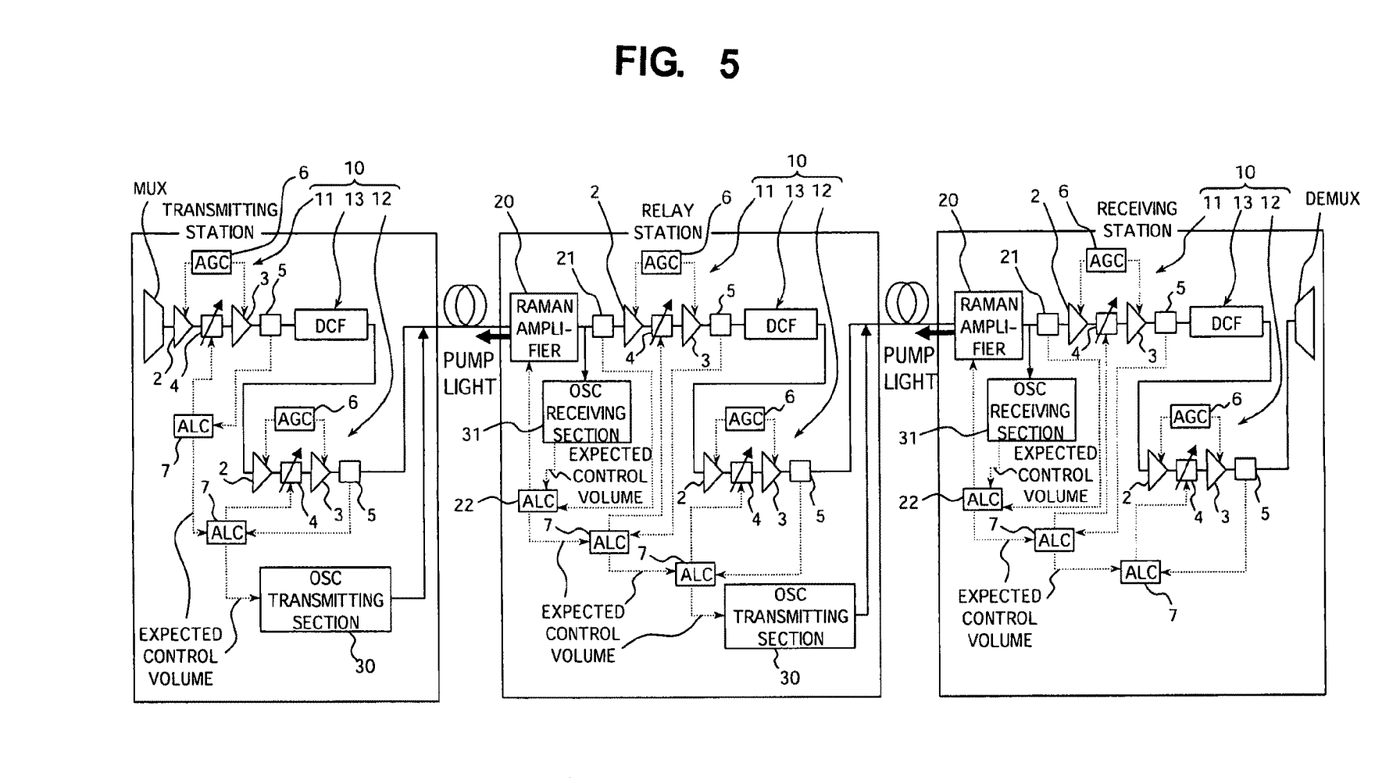
FIG. 5 is a diagram illustrating a embodiment of a WDM optical transmission system according to the present invention.

Next, FIG. 5 illustrates for explaining a WDM optical transmission system as specific example, in which, an optical amplifier with two cascade-connected EDFA optical amplification stages with a dispersion-compensating fiber (DCF) disposed therebetween, and a Raman optical amplifier in an input stage, are provided in the respective stations.

An optical amplifier 10 using the EDFA in this example includes a first optical amplification stage 11 and a second optical amplification stage 12, and a DCF 13 disposed therebetween. The first and second optical amplification stages 11 and 12 have the same configuration, and respectively include cascade-connected EDFAs 2 and 3, a VOA 4 disposed therebetween, a gain controller 6 that performs AGC of the EDFAs 2 and 3, and an output controller 7 that performs ALC by using a measured output value obtained by an optical power monitor 5, as illustrated in FIG. 1. The output controller 7 performs ALC by means of the aforementioned update interval and transmits a calculated expected control volume to the downstream station.

The transmitting station includes a multiplexer MUX that multiplexes optical signals of the respective wavelengths and the optical amplifier 10 that amplifies a WDM signal light output from the multiplexer MUX, and transmits the WDM signal light to the transmission line. The repeater station includes a Raman optical amplifier 20 in the input stage, and the signal light amplified by the Raman optical amplifier 20 is input to the optical amplifier 10 via the input power monitor 21. The receiving station also includes the Raman optical amplifier 20 on the input stage, and the signal light amplified by the Raman optical amplifier 20 is input to the optical amplifier 10 via an input power monitor 21. The WDM signal light output from the optical amplifier 10 in the receiving station is input to a demultiplexer DEMUX and demultiplexed into optical signals of each wavelength.

The Raman optical amplifier 20 in the repeater station and the receiving station supplies pump light for Raman amplification in a direction opposite to a propagation direction of the signal light with respect to the optical fiber of the transmission line for connecting the respective stations, to perform backward pumping. A quantity of the Raman pump light is controlled by a pump-light quantity controller 22 that performs ALC for controlling the level of the Raman-amplified WDM signal light to a constant value based on the measured input value obtained by the input power monitor 21. Because a portion of Raman optical amplification by the Raman optical amplifier 20 is a variable loss medium as in the VOA 4 of the optical amplifier 10, ALC may be performed as for the target attenuation value of the VOA 4.

In the case of the Raman optical amplifier 20, because its main object is to perform the Raman optical amplification in the optical fiber of the transmission line to suppress the loss of the signal light, a target loss value of the transmission line is adopted as a parameter the same as the target attenuation value of the VOA. Moreover, because the output thereof is measured by the input power monitor 21 as the input power of the own station, the target loss value of the transmission line is determined by "target loss value of transmission line (dB)=current target loss value of transmission line+expected control volume−[target input value−measured input value]". The target input value, based on the optimum value of the input power for each wavelength, is calculated by "target input value (dB)=optimum value (dBm/ch) of input power for each wavelength+10 LOG [number of wavelengths] (dB)+ASE yield (dB)". Because the optimum value of the input power is a parameter determined by the characteristic of the EDFA, and the EDFA has a characteristic where an optical SN ratio changes depending on the input level, it is appropriate to control the Raman gain, aiming at the best point of the characteristic. However, an abrupt signal error is not caused by a slight deterioration of the optical SN ratio even if the best point may not be obtained, and hence, the optimum value merely serves as a parameter for optimum control.

This target loss value of the transmission line is updated according to the equation described above at the update interval the same as the target attenuation value of ALC in the optical amplifier 10 of the own station, and the expected control volume at this time is a value received from the optical amplifier 10 in the upstream station. Then a value obtained by subtracting the measured input value from the target input value is transmitted to the downstream station as the expected control volume.

In the WDM optical transmission system illustrated in FIG. 5, the expected control volume is generated first from the output controller 7 in the first optical amplification stage 11 in the optical amplifier 10 of the transmitting station, and is transmitted to the output controller 7 in the downstream second optical amplification stage 12. That is, here the expected control volume is transmitted from the first optical amplification stage 11 as an upstream side to the second optical amplification stage 12 as a downstream side, and the target attenuation value is calculated according to the equation described above. The expected control volume transmitted from the output controller 7 in the second amplification stage 12 is transmitted to the transmission line from an OSC transmitting section 30 and is received by an OSC receiving section 31 in the repeater station.

The expected control volume from the upstream station received by the OSC receiving section 31 is provided to a pump-light quantity controller 22 of the Raman optical amplifier 20, and the Raman pump light quantity is adjusted by ALC according to the target loss value of the transmission line calculated according to the equation described above. Then the expected control volume of the pump-light quantity controller 22 is provided to the output controller 7 in the first optical amplification stage 11 of the downstream optical amplifier 10. The expected control volume by the output controller 7 is provided to the output controller 7 of the downstream second optical amplification stage 12. Then the expected control volume by the output controller 7 is transmitted to the receiving station via the OSC transmitting section 30.

The expected control volume received by the OSC receiving section 31 in the receiving station is provided to the pump-light quantity controller 22 of the Raman optical amplifier 20, and the Raman pump light quantity is adjusted by ALC according to the target loss value of the transmission line calculated by the equation described above. Then, the expected control volume of the pump-light quantity controller 22 is provided to the output controller 7 in the first optical amplification stage 11 of the downstream optical amplifier 10. The expected control volume by the output controller 7 is provided to the output controller 7 of the downstream second optical amplification stage 12.

Figure 6:
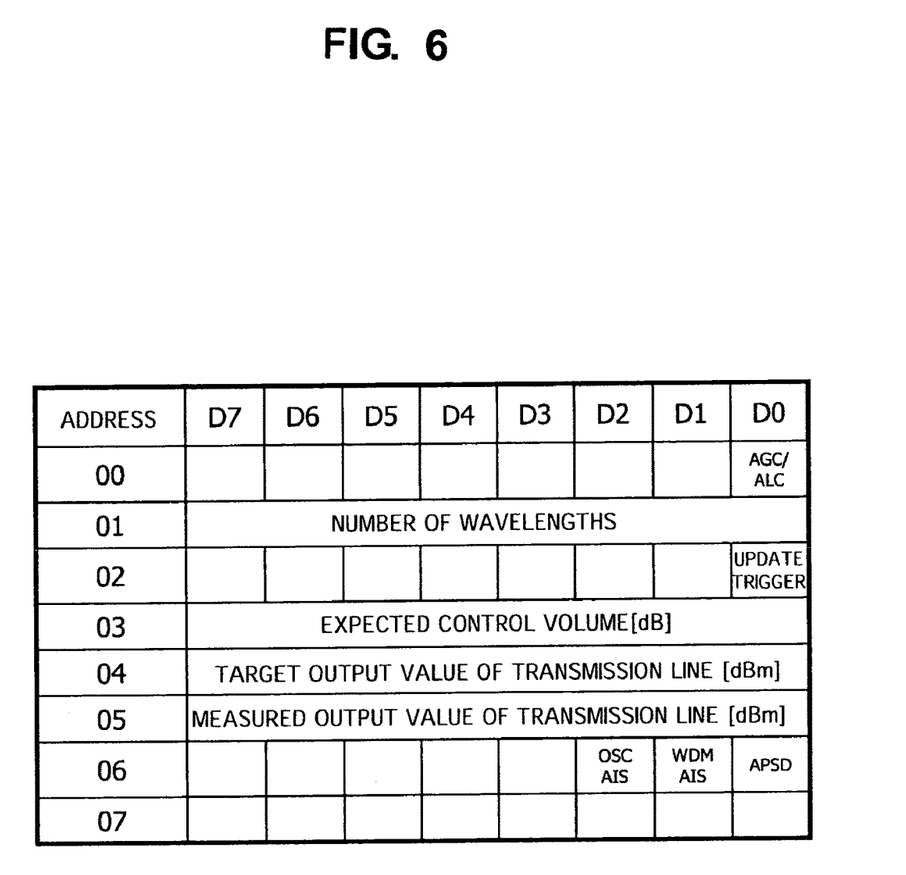
FIG. 6 is a format example of an OSC signal.

At this time, for example, a format illustrated in FIG. 6 may be adopted for a supervisory control signal transmitted by the OSC. [AGC/ALC] is data for switching an operation state by AGC and an operation state by ALC, and is transmitted from the transmitting station to the downstream station. This data [AGC/ALC] is relayed by the repeater station. As described above, AGC is performed during increment or decrement of the number of wavelengths, and ALC is performed in a normal state. The station having received the data instructing AGC immediately suspends ALC of the VOA and the Raman pump light. On the other hand, when the data instructing ALC is received, ALC performed by all the stations simultaneously described above is started. [Update Trigger] is trigger data for loading the expected control volume to update the target attenuation value and the target loss value of the transmission line. By including the data [Update Trigger] in the format, the update interval can be instructed from the upstream station to the downstream station to achieve synchronization. [Target Output Value of Transmission Line] is required when the initial value of the target loss value of the transmission line is set, and [Measured Output Value of Transmission Line] is required for controlling the Raman optical amplifier. [APSD] is an automatic shutdown request for controlling the light safely, and [WDM AIS] and [OSC AIS] are data for transmitting a loss of the WDM signal light and a loss of the OSC signal light that has occurred in the upstream station to the downstream station.

In the above manner, in the WDM optical transmission system in this example, because the expected control volume can be transmitted from the upstream station to the downstream station, and then the expected control volume also passes through the Raman optical amplifier 20 to start ALC in all the stations simultaneously, there is an advantage in that the above-mentioned waiting time for stabilization can be shortened and a variation in the level of the signal light can be suppressed.

The initial value of the target loss value of the transmission line needs to be considered also for the Raman optical amplifier 20 as in the VOA 4 at the time of startup from a disconnect of signal. As one example, a value obtained by subtracting the target input value (dBm) of the own station from the target output value (dBm) of the upstream station may be used. However, in the case of the VOA, the characteristic of the attenuation with respect to the control current or voltage can be measured beforehand, and the measured characteristic slightly changes after the transmission line is laid. In contrast, in the case of the Raman optical amplifier, special attention is required to the fact that the gain may change significantly after the transmission line is laid. That is, there is a characteristic where the gain of the Raman optical amplifier changes according to a loss coefficient (dB/km) of the laid optical transmission line, and a loss occurring in a connector or the like, through which the Raman pump light passes until it is coupled with the optical fiber of the transmission line. Accordingly, even when the gain is pumped by the same quantity of the Raman pump light, the gain may change from about 2 dB to 10 dB, and it is difficult to uniformly predict beforehand a relation between the quantity of the Raman pump light and the gain. Therefore, it is preferred that the initial value of the target loss value of the transmission line is set to the minimum quantity of the Raman pump light quantity that can be set, assuming a failure of an optical receiver due to a too much increase of the signal light power as a top priority risk.

Moreover, when the output of the Raman optical amplifier 20 is suspended due to trouble in the upstream station, the measured input value is not be detected. Therefore, the target loss value of the transmission line immediately before suspension of the output is held as in the case of the VOA 4. That is, the control value of the quantity of the Raman pump light associated with the target value immediately before the suspension is held, and this control value is adopted at the time of restart. The control can be performed thereafter according to transition from AGC to ALC of the optical amplifier 10. At this time, whether or not there is a replacement of the optical fiber of the transmission line can be dealt with by detecting a loss of the OSC signal light.

In the WDM optical transmission system, other than the components described above, there may be used a loss-variable device in which a loss varies by operation, such as a Virtually Imaged Phased Array (VIPA) variable dispersion compensator capable of adjusting a variance, a variable gain equalizer (Active GEQ) that compensates gain uniformity of the WDM signal light, and an add/drop filter that achieves branching and insertion of the wavelength. ALC using the expected control volume may be also performed with respect to such a loss-variable device. The VIPA device will be explained below as an example.

Figure 7:
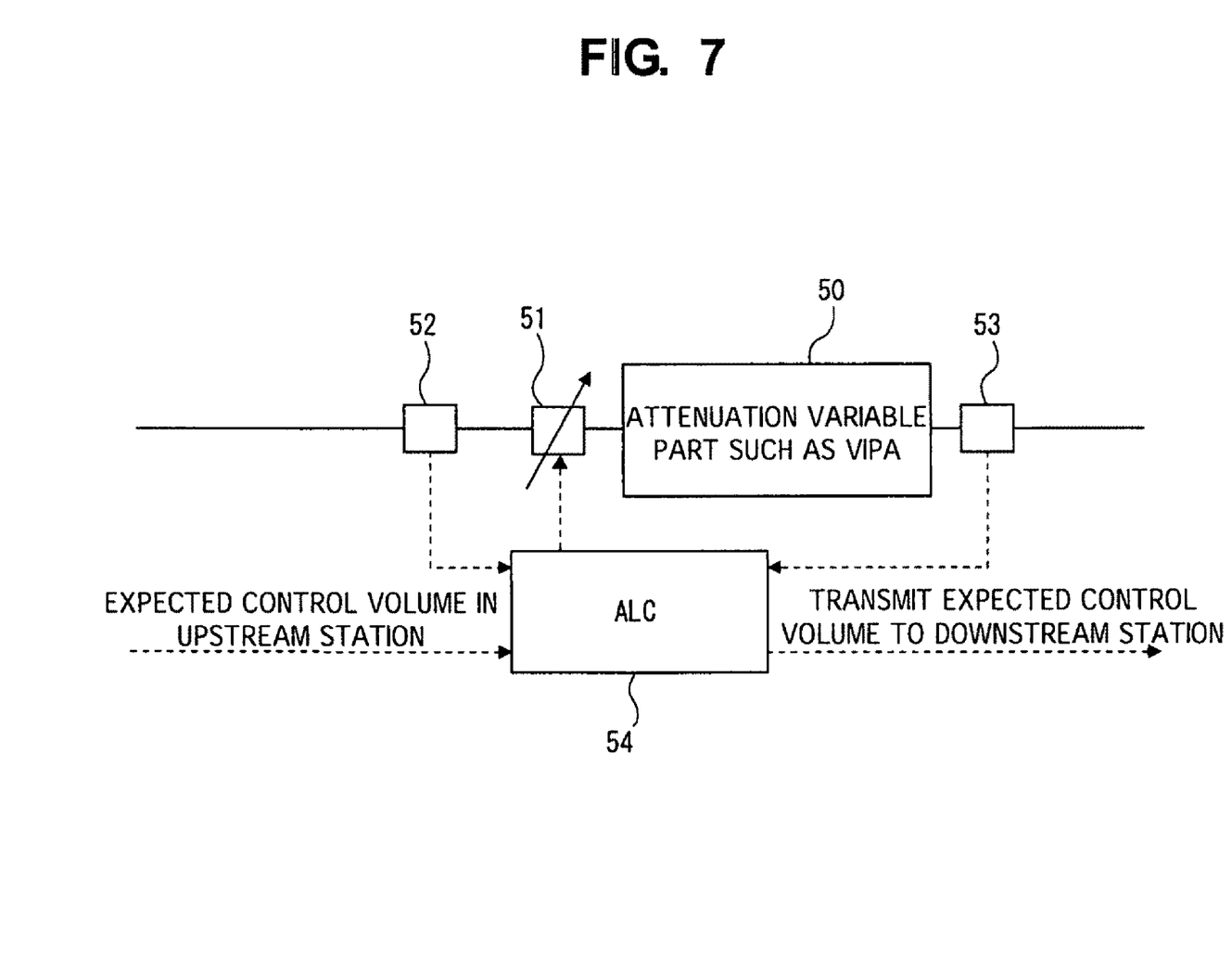
FIG. 7 is a diagram illustrating an embodiment for performing ALC with respect to a loss-variable device.

FIG. 7 illustrates a schematic circuit configuration. The VIPA is a dispersion compensating device including; a wavelength dispersive device (VIPA plate) in which a reflecting layer is coated on a parallel plane surface of a thin plate, and a reflecting mirror (refer to Japanese Laid-open Patent Publication No. 09-043057, for example). The device can adjust a variance value in a range of about ±1000 ps/nm. However, this has a characteristic in that, when the variance value is changed, an insertion loss is also changed. Therefore, for performing ALC thereto, in the example illustrated in FIG. 7, a VOA 51 is provided on a previous stage of the VIPA device 50. In addition, an input monitor 52 is provided on the previous stage of the VOA 51, and an output power monitor 53 is provided on a subsequent stage of the VIPA device 50, to obtain a measured input value and a measured output value. The position of the VOA 51 may be on the subsequent stage of the VIPA device 50.

A loss controller 54 receives the expected control volume from the upstream station, and calculates the target attenuation value with respect to the VOA 51 by the above-described equation "target attenuation value (dB)=current target attenuation value+expected control volume−[target output value−measured output value]", and performs ALC. Then, the loss controller 54 transmits [target output value−measured output value] of the own station to the downstream station as the expected control volume. The update interval of the target attenuation value can be set as a interval exceeding the output convergence time as described above.

By introducing such constant loss control, control of the VIPA device 50 can be performed according to only the dispersion, which is the original purpose. The loss variation at this time can be absorbed by performing ALC of the VOA 51 so that the total loss of the VIPA device 50 and the VOA 51 becomes constant.

Moreover, even when there is the loss-variable device, control described below can also be considered when the loss variation accompanying the operation can be predicted beforehand. That is, taking the VIPA device as one example, a dispersion-to-loss ratio is measured and stored beforehand in a single VIPA device. Then when the variance of the VIPA device is changed, a difference (changed portion) of the loss predicted before and after the change is calculated from the stored measured loss. If the difference is caused to flow to the downstream station as the expected control volume, the difference can be used in ALC of the downstream optical amplifier. In this case, because the loss is not a measured value but a predicted value, a deviation can occur actually. However, if the variation value has been defined, the loss is fixed, and there is no influence due to a discrepancy with the predicted value. Therefore, control is stable.

In the above embodiment, a case has been described were convergence on the target value of ALC is possible. However, there may be a case in which convergence on the target value is not achieved, and hence this case will be considered.

In the case of ALC by the VOA, there may be a case in which the output power does not reach the target output value even if the attenuation of the VOA is set to minimum. There are two reasons for this, that is, due to the input power being too low, and due to a loss increase in the optical amplifier. Moreover, in the case of the Raman optical amplifier, the output power may deviate from the target value of ALC because a loss in the transmission line is large, and the output power may not reach the target value even if the power of the Raman pump light is set to maximum, or on the contrary, because the loss in the transmission line is small, and the gain cannot be reduced even if the power of the Raman pump light is set to minimum.

In such a condition where the target value has reached a control limit, when ALC is performed by adopting the expected control volume, the expected control volume is continuously notified to the downstream station, although the target value has actually already reached the limit value in a certain station, and power control may not be performed further. Then in the downstream station, because ALC is continuously performed by adopting the expected control volume, the signal light power will never reach the target value. Therefore, when the target value reaches the control limit in any of the stations, the expected control volume may be set to a no-change value, that is, "0", and transmitted to the downstream station. In the downstream station that receives the expected control volume of "0", because the expected control volume is "0", in the VOA, ALC can be performed by setting a target value according to the equation of "target attenuation value=current target attenuation value−[target output value−measured output value]". Then, a value obtained by subtracting the measured output value from the target output value of the own station may be transmitted to the downstream station as the expected control volume.

According to such a system, an operation state can be obtained where maximum control is performed to the extent possible in a station where the target value of ALC may not be reached, and control range that may not be reached in that station is recovered in a normal station. Also in this control, if communication quality is affected by exceeding a limit, an alarm is issued.

The optical amplifier according to the embodiments sets an update interval of the target attenuation value of the VOA in each station to an interval exceeding the output convergence time by ALC, to thereby suppress an influence on ALC by output power variation of the upstream station (=input power variation of the own station). That is, although respective stations require from several seconds to several minutes for the output convergence time by ALC due to the reasons described above, update of the target value is suspended during the output convergence time, and variation of the output power is not reflected in the target attenuation value. Therefore, even if there is a variation in the input power of the own station, the influence on ALC is suppressed, so that convergence to a certain output target value is possible.

Moreover, the difference between the target output value and the measured output value in the upstream station is informed to the downstream station as the expected control volume. This expected control volume represents an expected volume of output power variation of the upstream station that can occur up until the next update of the target attenuation value, that is, an expected volume of input power variation of the downstream station. Therefore, if the expected control volume is received in the downstream station and reflected beforehand in the target attenuation value up until the next update, the VOA in each station acts to negate the variation with each other as a whole, to thereby suppress the variation in the level of the signal light power. That is, a so-called feed-forward is performed in which a variation of the signal light power at the next update time is informed from the upstream station to the downstream station, and the target attenuation value added with the expected variation of the input power is set in the own station. Therefore, a configuration in which a large variation in the level does not occur in the signal light is provided.

Accordingly, even if ALC is started simultaneously in the respective stations, there is no influence of output variation due to ALC in the upstream station during the time corresponding to the output convergence time. Therefore, there is no need to wait for stabilization of the signal light power to start ALC sequentially from the upstream station. Because ALC can be started simultaneously in all the stations, the waiting time for stabilization can correspond to the output convergence time, and the variation in the level of the wavelength power can be also suppressed by informing the downstream station of the expected control volume.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An optical amplifier that is provided in a repeater station of an optical transmission system to amplify a signal light and perform ALC (Automatic Level Control) of output power by means of a variable optical attenuator, wherein:
   the optical amplifier receives a difference between a target output value and measured output value of an upstream optical amplifier as an expected control volume;
   the optical amplifier updates a target attenuation value for the variable optical attenuator in accordance with a current target attenuation value set to the variable optical attenuator for ALC, a difference between its own target output value and measured output value, and the expected control volume;
   the target attenuation value is updated at intervals of time exceeding output convergence time by ALC; and
   the difference between own target output value and measured output value of the optical amplifier is adopted as an expected control volume for a downstream optical amplifier.

2. An optical amplifier according to claim 1, wherein the target attenuation value for when the signal light is input with an upper limit power of the input dynamic range of the optical amplifier, is set as an initial target attenuation value, at the time of start up after occurrence of disconnect of signal.

3. An optical amplifier according to claim 1, wherein:
   the target attenuation value for immediately before suspension of an output of the optical amplifier is held, when the output is suspended; and
   the held target attenuation value is set as an initial target attenuation value, at the time of restart of the suspended output.

4. An optical amplifier according to claim 1, wherein the expected control volume is made a no change value, in a case where the target attenuation value has reached a control limit of the variable optical attenuator.

5. An optical amplifier that is provided in a transmitting station of an optical transmission system to amplify a signal light and perform ALC (Automatic Level Control) of output power by means of a variable optical attenuator, wherein:
   the optical amplifier updates a target attenuation value for the variable optical attenuator in accordance with a current target attenuation value set to the variable optical attenuator for ALC and a difference between its own target output value and measured output value;
   the target attenuation value is updated at intervals of time exceeding output convergence time by ALC; and
   the difference between own target output value and measured output value of the optical amplifier is transmitted to a downstream optical amplifier as an expected control volume.

6. An optical amplifier according to claim 5, wherein the target attenuation value for when the signal light is input with an upper limit power of the input dynamic range of the optical amplifier, is set as an initial target attenuation value, at the time of start up after occurrence of disconnect of signal.

7. An optical amplifier according to claim 5, wherein:
the target attenuation value for immediately before suspension of an output of the optical amplifier is held, when the output is suspended; and
the held target attenuation value is set as an initial target attenuation value, at the time of restart of the suspended output.

8. An optical amplifier according to claim 5, wherein the expected control volume is made a no change value, in a case where the target attenuation value has reached a control limit of the variable optical attenuator.

9. An optical amplifier that is provided in a receiving station of an optical transmission system to amplify a signal light and perform ALC (Automatic Level Control) of output power by means of a variable optical attenuator, wherein:
the optical amplifier receives a difference between a target output value and measured output value of an upstream optical amplifier as an expected control volume;
the optical amplifier updates a target attenuation value for the variable optical attenuator in accordance with a current target attenuation value set to the variable optical attenuator for ALC, a difference between its own target output value and measured output value, and the expected control volume; and
the target attenuation value is updated at intervals of time exceeding output convergence time by ALC.

10. An optical amplifier according to claim 9, wherein the target attenuation value for when the signal light is input with an upper limit power of the input dynamic range of the optical amplifier, is set as an initial target attenuation value, at the time of start up after occurrence of disconnect of signal.

11. An optical amplifier according to claim 9, wherein:
the target attenuation value for immediately before suspension of an output of the optical amplifier is held, when the output is suspended; and
the held target attenuation value is set as an initial target attenuation value, at the time of restart of the suspended output.

12. An optical transmission system that is provided with an optical amplifier in a transmitting station, a repeater station, and a receiving station, the optical transmission system amplifies an signal light and performs ALC (Automatic Level Control) of output power by means of a variable optical attenuator, wherein:
the optical amplifier of the transmitting station
updates a target attenuation value for the variable optical attenuator in accordance with a current target attenuation value set to the variable optical attenuator for ALC and a difference between its own target output value and measured output value, while updating the target attenuation value at intervals of time exceeding output convergence time by ALC, and
transmits the difference between its own target output value and measured output value to a downstream optical amplifier as an expected control volume;
the optical amplifier of the repeater station
receives the difference between the target output value and measured output value of an upstream optical amplifier as the expected control volume,
updates the target attenuation value for the variable optical attenuator in accordance with the current target attenuation value set to the variable optical attenuator for ALC, the difference between its own target output value and measured output value, and the expected control volume, while updating the target attenuation value at intervals of time exceeding output convergence time by ALC, and
adopts the difference between its own target output value and measured output value as the expected control volume of the downstream optical amplifier; and
the optical amplifier of the receiving station
receives the difference between the target output value and measured output value of the upstream optical amplifier as the expected control volume, and
updates the target attenuation value for the variable optical attenuator in accordance with the current target attenuation value set to the variable optical attenuator for ALC, the difference between its own target output value and measured output value, and the expected control volume, while updating the target attenuation value at intervals of time exceeding output convergence time by ALC.

13. An optical transmission system according to claim 7, wherein
the target attenuation value for when the signal light is input with an upper limit power of the input dynamic range of the optical amplifier of its own station, is set in each station, at the time of start up after occurrence of disconnect of signal.

14. An optical transmission system according to claim 7, wherein:
the target attenuation value for immediately before suspension of an output of the optical amplifier of its own station is held, when the output of the optical amplifier of any of the stations is suspended; and
the held target attenuation value is set as an initial target attenuation value, at the time of restart of the suspended output.

15. An optical transmission system according to claim 7, wherein
the expected control volume is made a no change value in a downstream station, in a case where the target attenuation value has reached a control limit of the variable optical attenuator in any of the stations.

16. An optical transmission system according to claim 7, wherein
a Raman optical amplifier is provided in an input stage of the repeater station and the receiving station,
wherein the Raman optical amplifier:
receives the difference between the target output value and measured output value of the upstream optical amplifier as the expected control volume;
updates a target loss value of the transmission line for determining a quantity of Raman pump light, in accordance with a current target loss value of the transmission line for which the quantity of Raman pump light is determined, a difference between a target input value and measured input value of its own station, and the expected control volume, while updating the target loss value of the transmission line at updating intervals of the target attenuation value in the optical amplifier of its own station; and
adopts the difference between the target input value and measured input value of its own station as the expected control volume of the downstream optical amplifier.

17. An optical transmission system according to claim 16, wherein
the target loss value of the transmission line that determines a minimum set value of the quantity of Raman pump light, is set as an initial value of the target loss value of the transmission line, at the time of start up after occurrence of disconnect of signal.

18. An optical transmission system according to claim 16, wherein:
the target loss value of the transmission line for immediately before suspension of an output of the Raman optical amplifier of its own station is held, when the output of the Raman optical amplifier of any of the stations is suspended; and
the held target loss value of the transmission line is set as an initial target loss value of the transmission line, at the time of restart of the suspended output.

19. An optical transmission system according to claim 12, wherein:
a variable optical attenuator is cascade-connected with respect to a loss-variable device, in a case where the loss-variable device is included in any of the stations; and
ALC of the variable optical attenuator is performed so that the power of the signal light after passing through the loss-variable device and variable optical attenuator becomes constant.

20. An optical transmission system according to claim 19, wherein
the expected control volume of the upstream optical amplifier is applied to calculation of the target attenuation value in ALC of the variable optical attenuator that is cascade connected to the loss-variable device.

21. An optical transmission system according to claim 12, wherein:
a loss accompanying operation of a loss-variable device is measured beforehand and stored, in a case where the loss-variable device is included in any of the stations;
a expected variable amount of the loss is calculated from the stored loss, when the loss-variable device is operating; and
the variable amount is transmitted to the downstream optical amplifier as the expected control volume.

* * * * *